No. 892,234.
PATENTED JUNE 30, 1908.
G. ERICSON.
HAME FASTENER.
APPLICATION FILED NOV. 4, 1907.
2 SHEETS—SHEET 1.
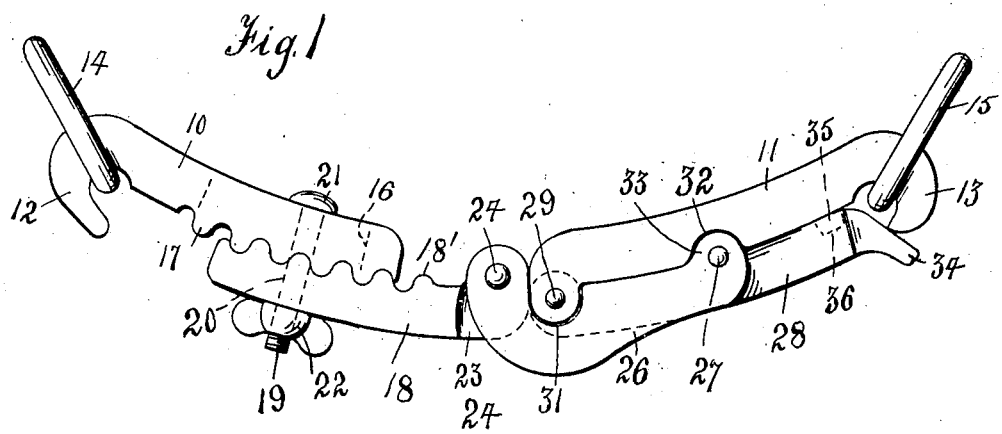
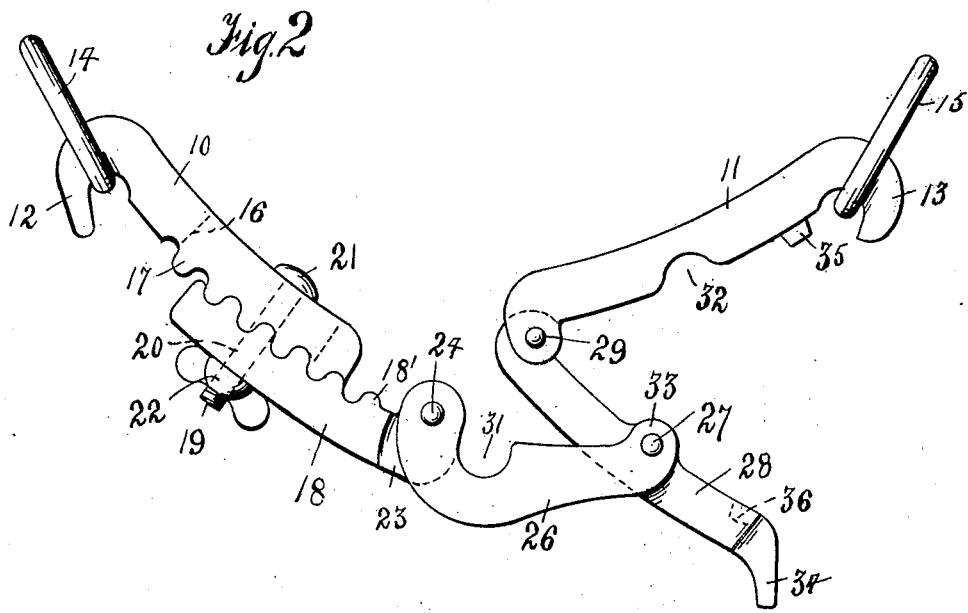
Witnesses
M. R. Meacham.
C. N. Woodward
G. Ericson, Inventor,
By Shoemaker & Brown
Atty's.

No. 892,234. PATENTED JUNE 30, 1908.
G. ERICSON.
HAME FASTENER.
APPLICATION FILED NOV. 4, 1907.
2 SHEETS—SHEET 2.
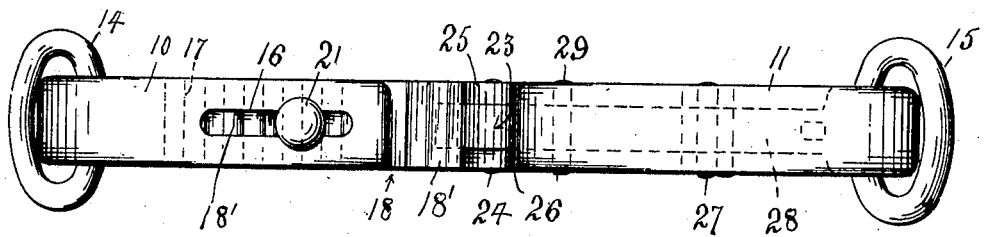
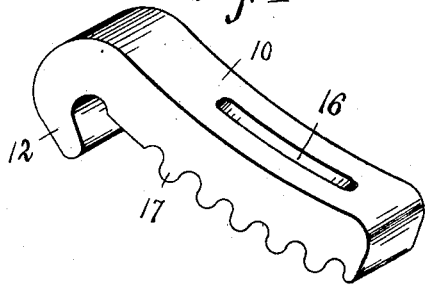
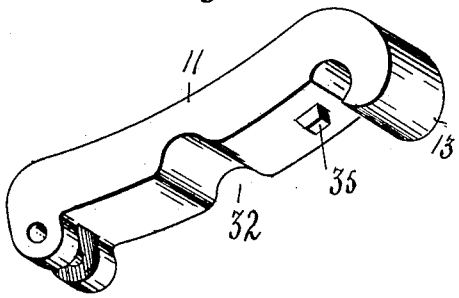
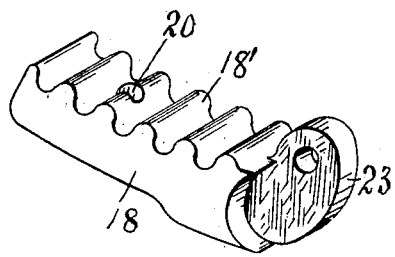
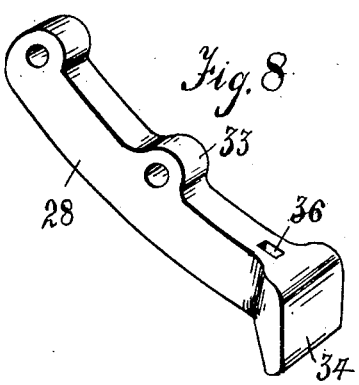
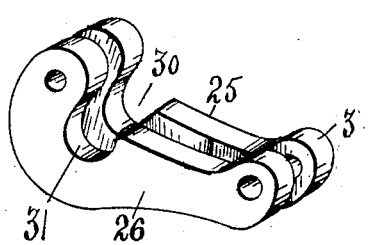
Witnesses
M. A. Meacham.
C. H. Woodward.
G. Ericson, Inventor,
By Shoemaker & Burn,
Atty's.

UNITED STATES PATENT OFFICE.

GEORGE ERICSON, OF RED WING, MINNESOTA.

HAME-FASTENER.

No. 892,234.      Specification of Letters Patent.      Patented June 30, 1908.

Application filed November 4, 1907. Serial No. 400,616.

*To all whom it may concern:*

Be it known that I, GEORGE ERICSON, a citizen of the United States, residing at Red Wing, in the county of Goodhue and State of Minnesota, have invented certain new and useful Improvements in Hame-Fasteners, of which the following is a specification.

This invention relates to the hame fastener portions of harnesses, and has for its object to simplify and improve the construction and increase the efficiency of devices of this character.

In the drawings is shown the preferred form of embodiment of the invention, and in the drawings thus employed, Figure 1 is a side elevation of the improved device in closed position. Fig. 2 is a side elevation of the improved device in open or inoperative position. Fig. 3 is a plan view of the device in the position shown in Fig. 1. Figs. 4, 5, 6, 7 and 8 are perspective views of the various parts of the device disassociated.

The improved device comprises two main members 10—11 having hooked outer ends, as at 12—13 to receive the rings represented at 14—15 of the hame members, the latter not being shown, as they form no part of the present invention. The member 10 is provided with a longitudinal slot 16, and with a plurality of spaced transverse teeth 17 formed in its lower face.

An extension member 18 is disposed beneath the member 10 and provided with a plurality of corresponding transverse teeth 18' adapted to be engaged adjustably with the teeth 17, as shown in Figs. 1 and 2, the two members 10—18 being adjustably coupled by a clamp screw 19 extending through an aperture 20 in the member 18 and likewise extending through the slot 16 and provided with a head 21 bearing upon the upper face of the member 10, and with a wing nut 22 bearing upon the member 18. By this means it will be obvious that the members 10—18 may be adjusted longitudinally of each other, within the scope of the engaging teeth 18' and the slot 16, and firmly clamped together by the screw 19.

The free end of the member 18 is provided with a central hinge member 23, and swinging from this hinge member by a pin 24 are spaced bars 25—26, and swinging by a pin 27 between the free ends of the bars 25—26 is a lever member 28, one end of the lever being pivotally connected to the inner end of the member 11 by a pin 29, the lever 28 extending within a cavity formed therefor in the member 11. The portion of the member 11 containing the pin 29 projects below the body of the member, and the members 25—26 are provided with recesses 30—31 to receive this projection, while the member 11 is also provided with a cavity 32 to receive a projecting portion 33 of the lever 28 at the point where the pin 27 is located. The free end of the lever 28 is provided with a depending thumb grip 34 and extends across the mouth of the hooked portion 13 of the member 11, when the device is closed as in Figs. 1 and 3, and thus locks the ring 15 within the hook. The member 11 is provided with a stud 35 adapted to enter a cavity or socket 36 in the lever 28, and thus prevent lateral displacement between the members 11—28. The stud 35 thus relieves the lateral strain upon the members 25—26.

The projecting portion 23 and the recesses 30—31 are so arranged that when the parts are in closed or folded position, as shown in Fig. 1, the pivot 29 will come outside of or below a line extended between the pivots 24 and 27, so that the lever 28 serves as a locking element, to retain the parts and prevent accidental displacement.

With the device thus constructed, when in open position, as shown in Fig. 2, the hame members may be distended to enable them to be readily removed from or arranged upon the collar, and when in this position the forward movement of the outer end of the lever 28 will cause the parts to assume the position shown in Figs. 1 and 3, and thus draw the lower ends of the hame members into the required position against the collar, and lock them in that position, and at the same time locking the ring 15 within the hook 13. As before stated, the members 10—18 may be adjusted longitudinally, and this adjustment enables the device to be adapted to any size of horse collar, as will be obvious.

The device may be manufactured in various sizes and wholly of metal, and finished in any desired manner, either by plating, galvanizing, japanning, or otherwise ornamented or protected.

Having thus described the invention, what is claimed as new is:—

1. A hame fastener comprising two body members having terminal hooks for engagement with the hame members, one of said body members having apertured projections at its inner end and a transverse cavity intermediate its ends, an extension member having means for adjustable connection to the other of said body members, spaced bars swinging from the free end of said extension member and with transverse cavities intermediate their ends and apertured projections at the free ends, and a lever swinging intermediate its ends between the apertured projections of said bars and pivoted at one end between the apertured projections of said body member, the lever adapted to assume a position parallel to the bars and with the projections of the body member within the intermediate recesses of the bars and the apertured projection of the bars within the intermediate recess of the body member.

2. A hame fastener comprising two body members having terminal hooks for engagement with the hame members, one of said body members having a depending lug and an intermediate recess and apertured projections at the inner ends, an extension member having means for adjustable connection with the other of said body members, spaced bars swinging from the free end of said extension member and with intermediate transverse recesses and apertured projections at the free ends, and a lever swinging intermediate its ends between the free ends of said bars and pivotally coupled at its inner end to the apertured projections of said body member and adapted to bear between said bars with the projections respectively of the body member and of the bars within said recesses.

3. A hame fastener comprising two body members having terminal hooks for engagement with the hame members and one of said body members provided with an apertured projection, an extension member having means for adjustable connection to the other of said body members, and with an apertured projection at the inner end, spaced bars swinging at one end from said projections and formed with transverse recesses adjacent thereto, and a lever swinging intermediate its ends between said bars and pivotally coupled at its inner end to the apertured projection of the body member and adapted to bear between said bars and against said last mentioned body member when in closed position with the projection of the body member within the recesses of the bars, whereby the lever produces a locking action between the parts when closed.

4. A hame fastener comprising two body members having terminal hooks for engagement with the hame members, a rigid extension member, means for coupling said rigid extension member for adjustment longitudinally of one of said body members, spaced bars swinging from the inner end of said extension member, and a lever swinging intermediate its ends between said bars and pivotally coupled at its inner end to the inner end of the other of said body members and adapted to bear between said bars and against said last mentioned body member when in closed position, said lever having an oblique terminal projection extending across the entrance to the terminal hook of the other body member.

5. A hame fastener comprising two body members having terminal hooks for engagement with the hame members, one of said body members having a projecting lug, a rigid extension member, means for coupling said extension member for adjustment longitudinally of one of said body members, a member swinging from the inner end of said extension member, and a lever swinging intermediate its ends from the free end of said swinging member and pivotally coupled at its inner end to the inner end of the other of said body members and adapted to bear between said bars and against said last mentioned body member when in closed position, said lever having a recess to receive said lug and with an obliquely directed projection extending across the entrance to the terminal hook of said other body member.

In testimony whereof I affix my signature, in presence of two witnesses.

GEORGE ERICSON.

Witnesses:
F. M. WILSON,
WM. M. ERICSON.